US012515528B2

(12) United States Patent
Flores-Bamaca

(10) Patent No.: US 12,515,528 B2
(45) Date of Patent: Jan. 6, 2026

(54) HIGH VOLTAGE INTERLOCK LOOP WIRE ELIMINATION SYSTEM AND METHOD

(71) Applicant: International Truck Intellectual Property Company, LLC, Lisle, IL (US)

(72) Inventor: Oscar Flores-Bamaca, Troy, MI (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 18/624,220

(22) Filed: Apr. 2, 2024

(65) Prior Publication Data

US 2025/0303872 A1 Oct. 2, 2025

(51) Int. Cl.
*B60L 58/10* (2019.01)
*B60L 3/00* (2019.01)
*B60L 58/20* (2019.01)
*H02J 7/02* (2016.01)

(52) U.S. Cl.
CPC ............ *B60L 3/0046* (2013.01); *B60L 58/20* (2019.02); *H02J 7/02* (2013.01); *B60L 2210/10* (2013.01)

(58) Field of Classification Search
CPC ...... B60L 3/0023; B60L 3/0046; B60L 58/10; B60L 58/18; B60L 58/20; B60L 2210/10; B60L 2210/14; H02J 7/02
See application file for complete search history.

(56) References Cited

U.S. PATENT DOCUMENTS

| | | |
|---|---|---|
| 4,739,184 A | 4/1988 | Onesti |
| 4,799,126 A | 1/1989 | Kruse |
| 4,845,465 A | 7/1989 | Kruse |
| 4,875,041 A | 10/1989 | Dannenberg |
| 4,900,946 A | 2/1990 | Williams |
| 5,030,884 A | 7/1991 | Roussey |
| 5,053,677 A | 10/1991 | Sanner |
| 5,245,251 A | 9/1993 | Irick |
| 5,365,436 A | 11/1994 | Schaller |
| 5,441,022 A | 8/1995 | Yoder |
| 5,449,956 A | 9/1995 | Williams |
| 5,563,547 A | 10/1996 | Blanchard |
| 5,585,784 A | 12/1996 | Pabla |
| 5,629,670 A | 5/1997 | Pabla |

(Continued)

FOREIGN PATENT DOCUMENTS

CN 101394129 A 3/2009

*Primary Examiner* — Long Nguyen
(74) *Attorney, Agent, or Firm* — Umang Khanna

(57) ABSTRACT

A high voltage interlock loop wire elimination system is provided for eliminating the need for a high voltage interlock loop wire when verifying operational status of high voltage rails between a rechargeable energy storage system, high voltage distribution box, and high voltage load. The high voltage interlock loop wire elimination system may include an electric vehicle control unit (EVCU), communication channel, voltage rail, high voltage distribution box (HVDB), DC voltage converter, and rechargeable electrical storage system (RESS). A method for eliminating the need for a high voltage interlock loop wire when verifying operational status of high voltage rails between a rechargeable energy storage system, high voltage distribution box, and high voltage load using the high voltage interlock loop wire elimination system is also provided.

20 Claims, 4 Drawing Sheets

(56) References Cited

U.S. PATENT DOCUMENTS

| | | |
|---|---|---|
| 5,677,671 A | 10/1997 | Pabla |
| 5,760,546 A | 6/1998 | Pabla |
| 5,780,974 A | 7/1998 | Pabla |
| 6,272,402 B1 | 8/2001 | Kelwaski |
| 6,297,566 B1 | 10/2001 | Lahr |
| 6,329,724 B1 | 12/2001 | Shaklik |
| 6,466,431 B1 | 10/2002 | Thomas |
| 6,515,425 B1 | 2/2003 | Bender |
| 6,522,029 B1 | 2/2003 | Bell |
| 6,690,140 B2 | 2/2004 | Larson |
| 6,724,102 B1 | 4/2004 | Kelwaski |
| 6,732,026 B2 | 5/2004 | Fleming |
| 6,738,701 B2 | 5/2004 | Wilson |
| 6,768,221 B2 | 7/2004 | Klinger |
| 6,841,895 B1 | 1/2005 | Kelwaski |
| 7,236,090 B2 | 6/2007 | Gumbel |
| 7,355,347 B2 | 4/2008 | Bell |
| 7,397,349 B2 | 7/2008 | Lahr |
| 7,421,323 B2 | 9/2008 | Dannenberg |
| 7,429,804 B2 | 9/2008 | Lengacher |
| 7,589,471 B2 | 9/2009 | Kaczorowski |
| 7,728,457 B2 | 6/2010 | Carnevale |
| 8,207,633 B2 | 6/2012 | Oleksiewicz |
| 10,870,353 B2 | 12/2020 | Zeng |
| 10,988,029 B2 | 4/2021 | Karlsson |
| 11,642,967 B2 | 5/2023 | Baumann |
| 11,888,388 B2 * | 1/2024 | Jin .................. H02M 1/322 |
| 2010/0013302 A1 | 1/2010 | Howell |
| 2010/0117459 A1 | 5/2010 | Dharmadhikari |
| 2010/0181827 A1 | 7/2010 | Cunningham |
| 2011/0012423 A1 | 1/2011 | Gollmer |
| 2011/0018339 A1 | 1/2011 | Oriet |
| 2011/0018476 A1 | 1/2011 | Oriet |
| 2011/0210605 A1 | 9/2011 | Duan |
| 2011/0309680 A1 | 12/2011 | Oleksiewicz |
| 2012/0031687 A1 | 2/2012 | Renfrow |
| 2013/0009465 A1 | 1/2013 | Bajjuri |
| 2013/0054085 A1 | 2/2013 | Casey |
| 2014/0062180 A1 | 3/2014 | Demmerle |
| 2014/0375120 A1 | 12/2014 | Bissontz |
| 2015/0015063 A1 | 1/2015 | Bissontz |
| 2015/0084414 A1 | 3/2015 | Bissontz |
| 2015/0130274 A1 | 5/2015 | Bissontz |
| 2015/0217640 A1 | 8/2015 | Bissontz |
| 2016/0039369 A1 | 2/2016 | Flaster |
| 2024/0017627 A1 * | 1/2024 | Wang .................. H02J 7/0047 |

\* cited by examiner

HIGH VOLTAGE INTERLOCK LOOP WIRE ELIMINATION SYSTEM AND METHOD

FIELD OF THE INVENTION

The present disclosure relates to a high voltage interlock loop wire elimination system. More particularly, the disclosure relates to eliminating the need for a high voltage interlock loop wire when verifying operational status of high voltage rails between a rechargeable energy storage system, high voltage distribution box, and high voltage load.

BACKGROUND

The traditional strategy of managing high voltage interlock loop (HVIL) systems in electric vehicles (EVs) involves using multiple wire loops connected through a high voltage distribution box (HVDB), rechargeable energy storage system (RESS), and all high-voltage components. However, the use of multiple wire loops, or grouping loads to reduce the number of loops, as illustrated in FIG. 4 of this disclosure, introduces complexity and potential points of failure into the system. Each additional wire loop or connection increases the risk of a fault, such as a short circuit or a disconnection, which can compromise the safety of the vehicle. This complexity not only makes the system more prone to failure but also complicates troubleshooting and repair, potentially leading to longer downtimes and higher maintenance costs.

Furthermore, traditional wire loop HVIL systems of the prior art pose a reliability concern. Over time, wires can degrade due to environmental factors like temperature fluctuations, vibration, and humidity. This degradation can lead to intermittent connections or total failure of the HVIL system, which are difficult to predict and diagnose. Such reliability issues are critical in safety systems, as they could lead to dangerous situations where the vehicle does not correctly detect a high voltage breach.

The traditional wire loop approach to HVIL monitoring is somewhat antiquated in the context of rapidly advancing EV technologies. Modern vehicles are increasingly incorporating sophisticated electronic monitoring and control systems that offer higher accuracy, reliability, and diagnostic capabilities. Clinging to a more mechanical, wired approach might impede the integration of more advanced, software-based safety and monitoring systems, which can offer enhanced functionalities such as real-time system health checks and predictive maintenance alerts.

Therefore, a need exists to solve the deficiencies present in the prior art. What is needed is a system to manage high voltage interlock loops without requiring multiple loops of wire to be ran through a high voltage distribution box, rechargeable energy storage system, and high voltage loads. What is needed is a system to simplify electrical connections in an electric vehicle using evaluation voltages provided by a DC voltage converter. What is needed is a system to verify compliance with expected operation of high voltage connections in an electrical vehicle application without requiring use of multiple high voltage interlock loops. What is needed is a method of validating high voltage connections using conversion of DC voltages to eliminate reliance on wire loops connected to multiple high voltage loads.

SUMMARY

An aspect of the disclosure advantageously provides a system to manage high voltage interlock loops without requiring multiple loops of wire to be ran through a high voltage distribution box, rechargeable energy storage system, and high voltage loads. An aspect of the disclosure advantageously provides a system to simplify electrical connections in an electric vehicle using evaluation voltages provided by a DC voltage converter. An aspect of the disclosure advantageously provides a system to verify compliance with expected operation of high voltage connections in an electrical vehicle application without requiring use of multiple high voltage interlock loops. An aspect of the disclosure advantageously provides a method of validating high voltage connections using conversion of DC voltages to eliminate reliance on wire loops connected to multiple high voltage loads.

Accordingly, the disclosure may feature a high voltage interlock loop elimination system for validating a high voltage connection in an electric vehicle including an electric vehicle control unit (EVCU), high voltage distribution box (HVDB), rechargeable electrical storage system (RESS), DC voltage converter, and/or other components. The EVCU may be configured to receive a communication signal comprising voltage report data indicative of an operational status of the high voltage connection. The HVDB may be electrically connected to a high voltage load via a load high voltage rail, the high voltage load being capable of reporting a load voltage reading for the load high voltage rail to be included by the voltage report data. The RESS may be electrically connected to the HVDB to selectively provide high voltage electrical power to the high voltage load via the HVDB, the RESS comprising a RESS high voltage connection to the HVDB that is switchable between a RESS open state and RESS closed state. The DC voltage converter may be electrically connected between the HVDB and a low voltage power source.

Prior to setting the RESS high voltage connection to the RESS closed state, the DC voltage converter may boost low voltage electrical power from the low voltage power source to evaluation voltage electrical power to be provided to the high voltage load over the load high voltage rail via the HVDB. The high voltage load may detect the load voltage reading of the evaluation voltage electrical power received over the load high voltage rail to report to the EVCU via the communication channel in the voltage report data. The EVCU may analyze the voltage report data to determine compliance with an acceptable proximity to an evaluation voltage set point. If the voltage report data is not compliant with the evaluation voltage set point, the EVCU may determine the operational status to indicate that a HVIL breach has occurred. If the voltage report data is compliant with the evaluation voltage set point, the EVCU may determine the operational status is nominal and control the DC voltage converter to boost the low voltage electrical power to high voltage electrical power to be provided to the high voltage load via the HVDB at a high voltage set point.

Upon determining by the EVCU that the high voltage set point is reached and stable, the RESS high voltage connection may be set to the RESS closed state to transmit the high voltage electrical power from the RESS to the high voltage load via the HVDB. The voltage report data may continue to be monitored by the EVCU to ensure compliance with the acceptable proximity to the high voltage set point and, if detecting the compliance as false, determining the operational status to indicate the HVIL breach has occurred.

In another aspect, the high voltage electrical power is equivalent to voltage class B as defined by ISO 21498-1.

In another aspect, the RESS may detect a RESS voltage differential received over the RESS high voltage connection to report to the EVCU via the communication channel in the voltage report data.

In another aspect, the load voltage reading of the load high voltage rail may be measured between a high voltage load positive terminal and high voltage load negative terminal.

In another aspect, the communication network may operate via a controller area network (CAN), local interconnect network (LIN), and/or Automotive Ethernet.

In another aspect, the DC voltage converter may be a buck-boost DC-to-DC power converter.

In another aspect, the low voltage power may be between about 12 volts to 24 volts.

In another aspect, the evaluation voltage power may be between about 40 volts and 60 volts.

In another aspect, the low voltage power source may include an automotive battery.

According to an alternative embodiment, a system is provided for eliminating high voltage interlock loop for validating a high voltage connection in an electric vehicle comprising an EVCU, HVDB, RESS, DC voltage converter, and/or other components. The EVCU may be configured to receive a communication signal comprising voltage report data indicative of an operational status of the high voltage connection. The HVDB may be electrically connected to a high voltage load via a load high voltage rail, the high voltage load reporting a load voltage reading for the load high voltage rail to be included by the voltage report data. The RESS may be electrically connected to the HVDB to selectively provide high voltage electrical power to the high voltage load via the HVDB. The RESS may include a RESS high voltage connection to the HVDB that is switchable between a RESS open state and RESS closed state via the EVCU. The DC voltage converter may be electrically connected between the HVDB and a low voltage power source. The DC voltage converter may be a buck-boost DC-to-DC power converter.

Prior to setting the RESS high voltage connection to the RESS closed state, the DC voltage converter may boost low voltage electrical power from the low voltage power source to evaluation voltage electrical power to be provided to the high voltage load over the load high voltage rail via the HVDB. The high voltage load may detect the load voltage reading of the evaluation voltage electrical power received over the load high voltage rail to report to the EVCU in the voltage report data. The RESS may detect a RESS voltage differential received over the RESS high voltage connection to report to the EVCU via the communication channel in the voltage report data. The EVCU may analyze the voltage report data to determine compliance with an acceptable proximity to the evaluation voltage set point. Voltage report data that is not compliant with the evaluation voltage set point may indicate that a HVIL breach has occurred. Voltage report data that is compliant with the evaluation voltage set point may indicate the operational status is nominal. The DC voltage converter may be controlled to boost the low voltage electrical power to high voltage electrical power to be provided to the high voltage load via the HVDB at a high voltage set point. Upon determining by the EVCU that the high voltage set point is reached and stable, the RESS high voltage connection may be set to the RESS closed state to transmit the high voltage electrical power from the RESS to the high voltage load via the HVDB.

In another aspect, after the RESS high voltage connection is set to the RESS closed state, the EVCU may monitor the voltage report data to ensure compliance with the acceptable proximity to the high voltage set point and, if detecting the compliance is false, determining the operational status to indicate the HVIL breach has occurred.

According to an embodiment enabled by this disclosure, a method may be provided for validating a high voltage connection in an electric vehicle. The vehicle may include an EVCU configured to receive a communication signal comprising voltage report data indicative of an operational status of the high voltage connection, and a RESS electrically connected to a HVDB to selectively provide high voltage electrical power to a high voltage load via the HVDB.

The method may include a) boosting, via a DC voltage converter electrically connected between the HVDB and a low voltage power source, low voltage electrical power from the low voltage power source to evaluation voltage electrical power to be provided to the high voltage load over a load high voltage rail via the HVDB. The method may additionally include b) detecting, via the high voltage load, a load voltage reading of the evaluation voltage electrical power received over the load high voltage rail to report to the EVCU via the communication channel in the voltage report data. Furthermore, the method may include c) analyzing, via the EVCU, the voltage report data to determine compliance with an acceptable proximity to an evaluation voltage set point. Step c) may further include i) if the voltage report data is not compliant with the evaluation voltage set point, determining the operational status to indicate that a HVIL breach has occurred, and ii) if the voltage report data is compliant with the evaluation voltage set point, determining the operational status is nominal and controlling the DC voltage converter to boost the low voltage electrical power to the high voltage electrical power to be provided to the high voltage load via the HVDB at a high voltage set point. The method may additionally include d) upon determining by the EVCU that the high voltage set point is reached and stable, setting a RESS high voltage connection between the RESS and the HVDB to a RESS closed state to transmit the high voltage electrical power from the RESS to the high voltage load via the HVDB. The method may include e) monitoring the voltage report data by the EVCU to ensure compliance with the acceptable proximity to the high voltage set point and, if detecting the compliance is false, determining the operational status to indicate the HVIL breach has occurred. The RESS high voltage connection may be switchable between a RESS open state and the RESS closed state via the EVCU.

In another aspect of the method, the high voltage electrical power may be at least 600 volts. In some embodiments, the high voltage electrical power may be about 800 volts.

In another aspect of the method, step b) may further include detecting, via the RESS, a RESS voltage differential received over the RESS high voltage connection to report to the EVCU via the communication channel in the voltage report data.

In another aspect of the method, the load voltage reading of the load high voltage rail may be measured between a high voltage load positive terminal and high voltage load negative terminal.

In another aspect of the method, the communication network may operate via a controller area network (CAN).

In another aspect of the method, the DC voltage converter may be a buck-boost DC-to-DC power converter.

In another aspect of the method, the low voltage power may be between about 12 volts to 24 volts.

In another aspect of the method, the evaluation voltage power may be between about 40 volts and 60 volts.

In another aspect of the method, the low voltage power source may include an automotive battery.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
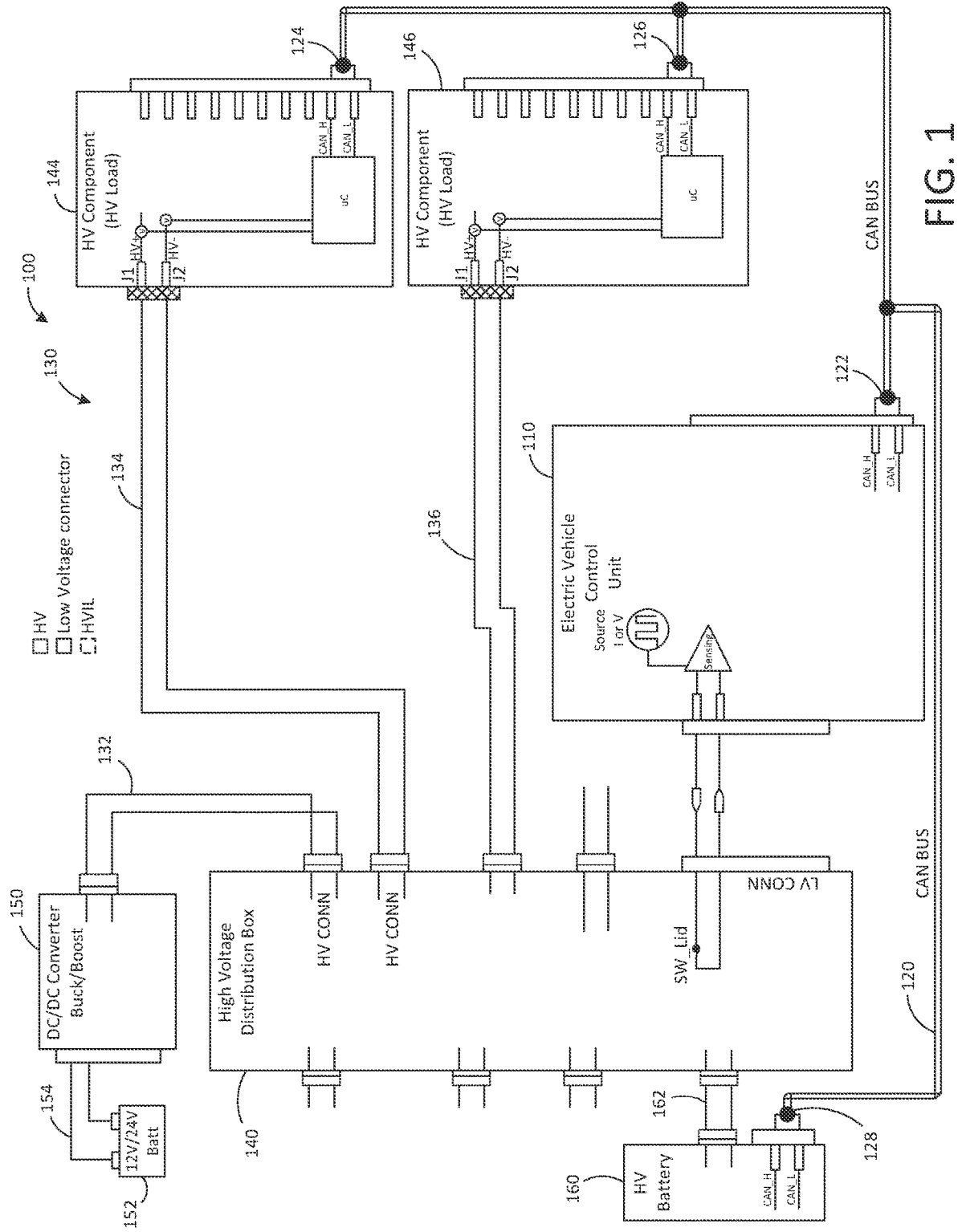
FIG. 1 is a block diagram view of a novel system to determine operational status of electrical connections, according to an embodiment of this disclosure.

The following disclosure is provided to describe various embodiments of a high voltage interlock loop wire elimination system and associated method. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

For the purpose of clearly describing the components and features discussed throughout this disclosure, some frequently used terms will now be defined, without limitation. The term high voltage, as it is used throughout this disclosure, is within voltage class B as defined by ISO 21498-1—classification of an electric component or circuit with a maximum working voltage (3.5) of (>30 and ≤1 000) V AC (rms) or (>60 and ≤1 500) V DC respectively. The term evaluation voltage, as it is used throughout this disclosure, is defined as a voltage elevated above a standard voltage of an automotive battery and below a minimum safe threshold, which in some applications may be within voltage class A as defined by ISO 21498-1—classification of an electric component or circuit with a maximum working voltage (3.5) of ≤30 V AC (rms) or ≤60 V DC respectively. The term low voltage, as it is used throughout this disclosure, is defined as a voltage that may be considered generally safe for human contact, which may correspond with voltages provided by an automotive battery, for example and without limitation, about 12 or 24 volts.

The term electric vehicle, as it is used throughout this disclosure, is defined as a vehicle that is propelled in part or in whole by electric motors, which may use energy stored by a rechargeable electrical storage system and/or batteries. The term communication signal, as it is used throughout this disclosure, is defined as a signal to convey data and other information between various components of a system, such as may be enabled by this disclosure. The term boost-buck DC-to-DC voltage converter, as it is used throughout this disclosure, is defined as a type of power converter that can step up (boost) or step down (buck) a direct current (DC) voltage, which can allow a DC input voltage to be converted to a higher or lower DC output voltage, making it versatile for variable power delivery conditions. The term high voltage interlock loop (HVIL) breach, as it is used throughout this disclosure, is defined as a breach in the high voltage interlock loop that may indicate a failure or disconnection in the system, potentially signaling a safety hazard due to unintended exposure to high voltage. The term automotive battery, as it is used throughout this disclosure, is defined as a rechargeable battery that supplies electrical energy to a motor vehicle and/or high voltage loads, which in some applications may be charged via the DC-to-DC converter operating in buck mode, which can transfer energy from the RESS to the automotive battery. In alternative embodiments, the automotive battery may be charged with the assistance of an alternator, such as may be provided by an internal combustion engine.

Various aspects of the present disclosure will now be described in detail, without limitation. In the following disclosure, a high voltage interlock loop wire elimination system will be discussed. Those of skill in the art will appreciate alternative labeling of the high voltage interlock loop wire elimination system as a high voltage connection inspection system, electrical circuit validation and breach detection system, advanced voltage management system, the invention, or other similar names. Similarly, those of skill in the art will appreciate alternative labeling of the high voltage interlock loop wire elimination system as a method of eliminating high voltage interlock loops in electrical vehicle application, method of verifying electrical connections prior to energizing with high voltage electrical power, power delivery verification and management method, method, operation, the invention, or other similar names. Skilled readers should not view the inclusion of any alternative labels as limiting in any way.

Figure 2:
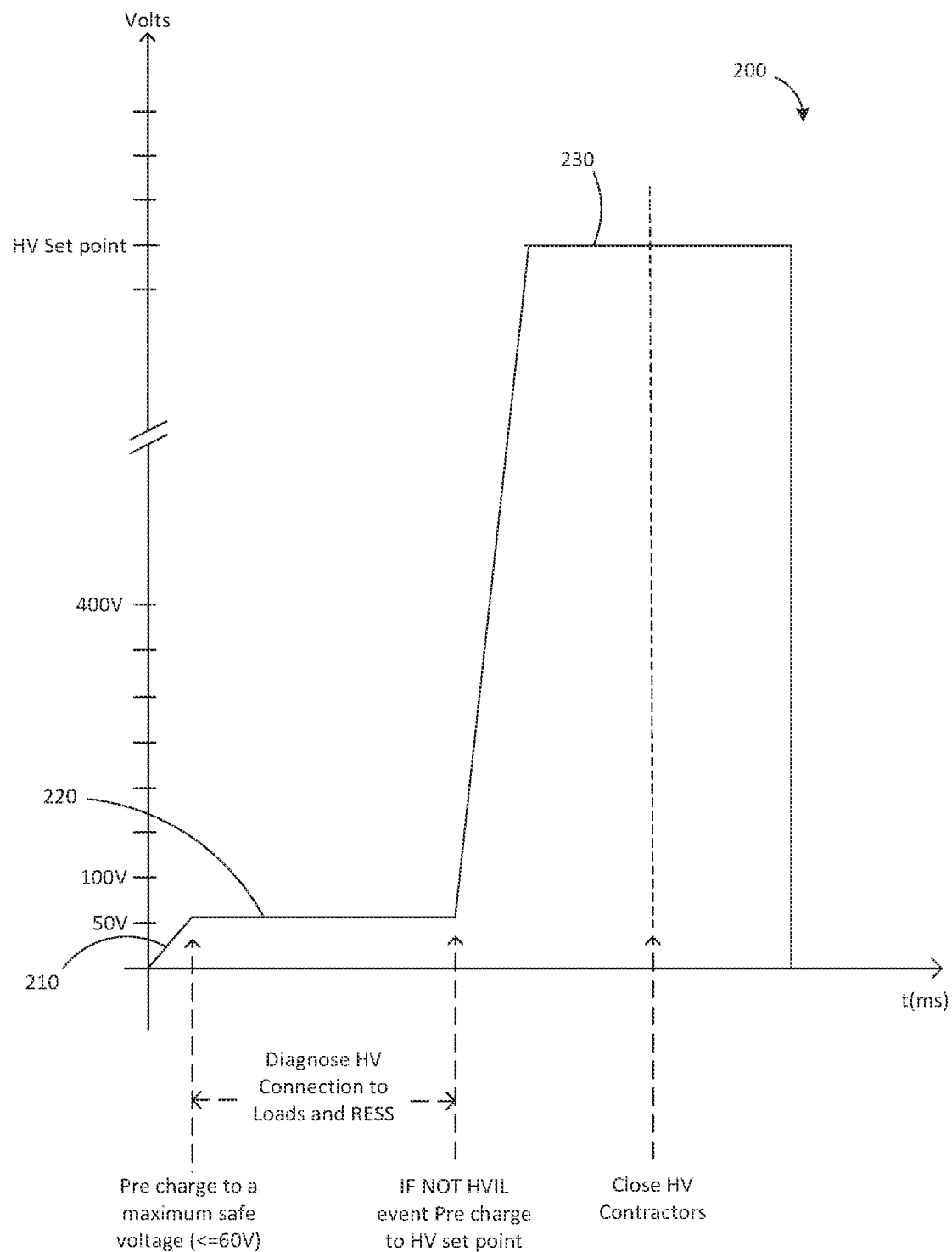
FIG. 2 is a graph view of an illustrative voltage over time during operation of a system enabled by this disclosure, according to an embodiment of this disclosure.
Figure 3:
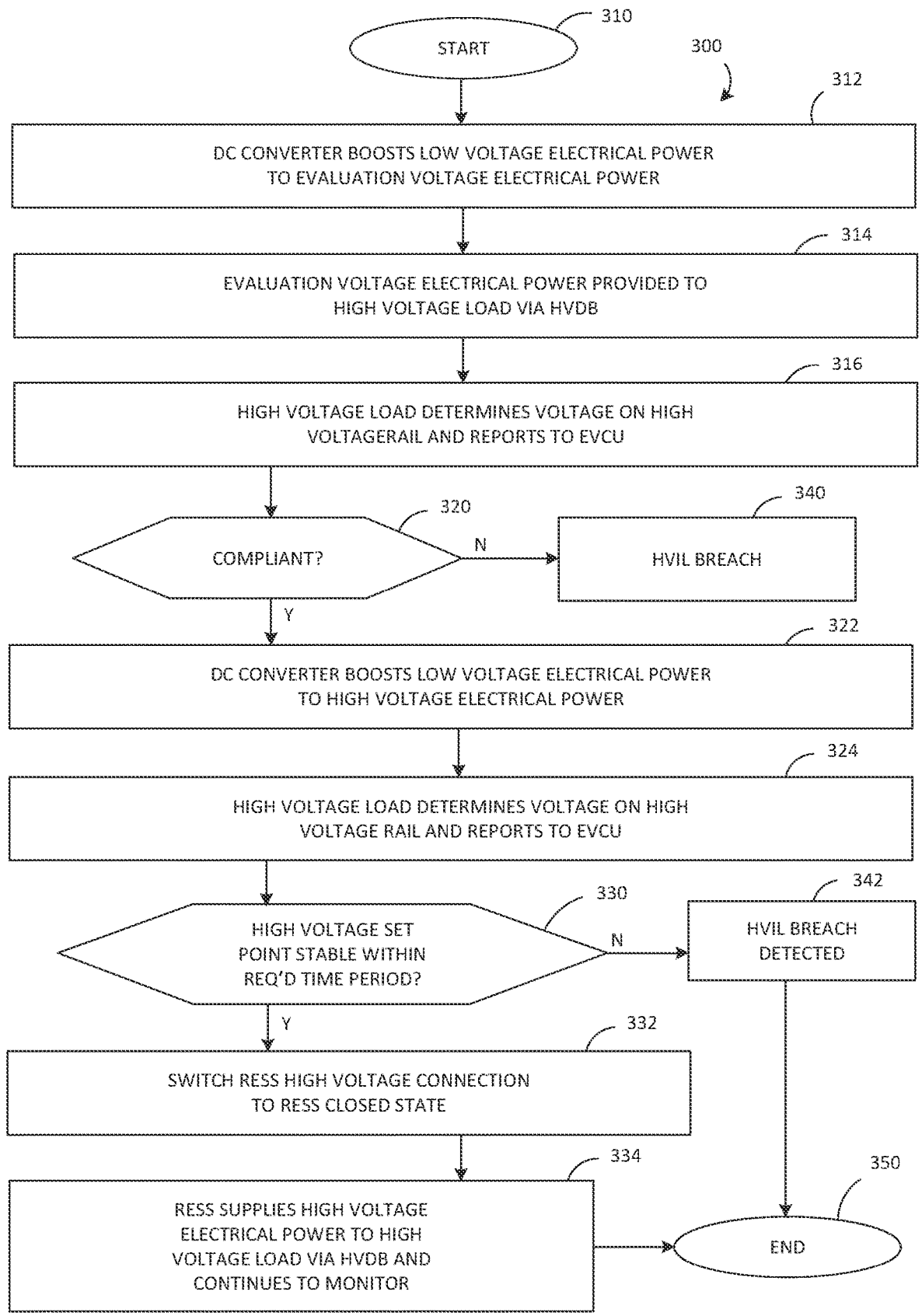
FIG. 3 is a flow chart view of an illustrative operation to validate an electrical connection, according to an embodiment of this disclosure.
Figure 4:
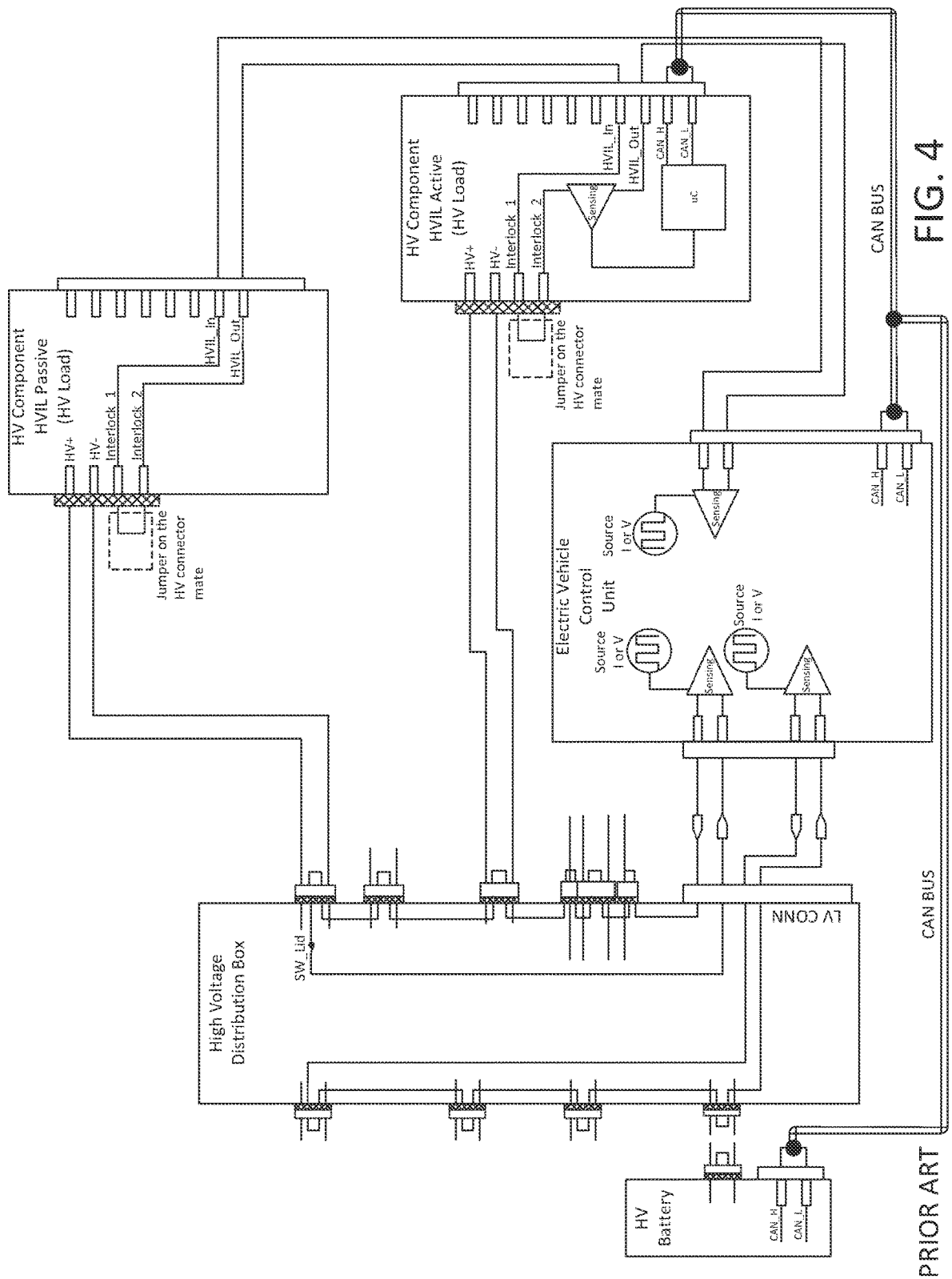
FIG. 4 is a block diagram view of a prior art system highlighting the deficiencies that are improved upon by a system and method enabled by this disclosure.

Referring now to FIGS. 1-3, the high voltage interlock loop wire elimination system will now be discussed in more detail. The high voltage interlock loop wire elimination system may include an electric vehicle control unit (EVCU), communication channel, high voltage rail, high voltage distribution box (HVDB), DC voltage converter, rechargeable electrical storage system (RESS), and additional components that will be discussed in greater detail below. The high voltage interlock loop wire elimination system may operate one or more of these components interactively with other components to eliminate the need for a high voltage interlock loop wires when verifying operational status of high voltage rails between a RESS, HVDB, and one or more high voltage loads.

An illustrative high voltage interlock loop elimination system will now be discussed in greater detail. FIG. 1 highlights an example of the high voltage interlock loop elimination system, which may also be shown in other figures. As shown in the block diagram FIG. 1, the example system 100 may include an electric vehicle control unit EVCU 110, which may be used to control the operation of various other components of an electric vehicle. The EVCU 110 will be discussed in greater detail below.

The EVCU 110 may connect with additional components via a communication channel 120. The communication channel 120 may include multiple communication channel terminals 122, 124, 126, 128. For example, the EVCU 110 may include a communication channel EVCU terminal 122. The first high voltage load 144 may include a communication channel first load terminal 124. In some embodiments, an optional second high voltage load 146 may be provided, which may include a communication channel second load terminal 126. The high voltage loads may be configured as active high voltage loads, passive high voltage loads, and/or other high voltage load types that would be appreciated by those of skill in the art after having the benefit of this disclosure. The RESS 160 may include communication channel RESS terminal 128. The communication channels and connected components will be discussed in greater detail below. Those of skill in the art will appreciate additional components that may be included by an electric vehicle, which may additionally be connected to the communication channel via respective terminals, without limitation.

The example system 100 may additionally include one or more high voltage rails 130. For example, the high voltage rails 130 may include a DC voltage converter high voltage rail 132, first high voltage load rail 134 to connect to a first high voltage load, second high voltage load rail 136 to connect to a second high voltage load if provided, and/or additional high voltage rails that would be appreciated by those of skill in the art after having the benefit of this disclosure. The high voltage rails 130 may connect between various components, for example, a HVDB 140 and one or more high voltage loads 144, 146. For illustrative purposes, multiple high voltage loads are displayed in the example system 100 of FIG. 1 without limitation, including a first high voltage load 144 as a first illustrative high voltage load and a second high voltage load 146 as a second illustrative high voltage load. Those of skill in the art will appreciate that additional high voltage loads may be attached and/or electrically connected to the HVDB without limitation, and such skilled artisans will appreciate how such electrical connections may operate after having the benefit of this disclosure.

A DC voltage converter 150 may additionally be provided to convert voltages between a low voltage power source 152 and the high voltage rails 130 connected via the HVDB 140. The low voltage power source 152 may be connected to the DC voltage converter 150 via a low voltage rail 154. The DC voltage converter 150 may be able to convert the DC voltage between the low voltage rail 154 and the DC voltage converter high voltage rail 132. Various configurations for the DC voltage converter 150 will be discussed in greater detail later in this disclosure.

The RESS 160 may deliver high capacity, high voltage electrical power to various high voltage loads included by a system enabled by this disclosure, such as the example system 100 shown in FIG. 1. An RESS high voltage connection 162 may electrically connect the RESS 160 to the HVDB 140. As will be discussed in greater detail below, the RESS high voltage connection 162 may be switched between an RESS open state and an RESS closed state, which may be controlled via the EVCU 110 respective to an operational state of the example system 100 and/or additional systems enabled by this disclosure.

The electric vehicle control unit (EVCU) will now be discussed in greater detail. FIG. 1 highlights examples of EVCU 110, which may also be shown in other figures. An EVCU 110 is a part of an electric vehicle (EV) control system, which manages various aspects of vehicle operation and performance. The EVCU 110 may coordinate and control different subsystems to ensure efficient and safe functioning. The EVCU 110 may manage and regulate the EV electric powertrain, which may include controlling the electric motor, managing battery charging and discharging processes, and ensuring the optimal operation of the vehicle's propulsion system.

The EVCU 110 is linked with various other systems in the vehicle, such as a battery management system (BMS), thermal management systems, and various sensors and actuators. The EVCU 110 may also monitor the EV systems for safety, check for faults or anomalies in the electric powertrain and other systems, and take actions such as limiting power or even shutting down systems to ensure passenger safety. The EVCU 110 may receive and process data reports, such as voltage report data, from various components of the vehicle. This data is typically transmitted via communication signals, such as may be communicated via a controller area network (CAN), local interconnect network (LIN), wireless network, and/or other communication network that would be apparent to a person of skill in the art after having the benefit of this disclosure.

The EVCU 110 may analyze voltage report data from the vehicle's systems to monitor and optimize performance. For instance, the EVCU 110 may assess data relating to high voltage rails 130, HVDB, 140, high voltage loads 144, 146, RESS 160, and other components to ensure they are operating within their respective nominal operational status, adjusting control strategies as needed for optimal performance. The voltage report data received via communication signals may enable the EVCU to perform fault detection and diagnostics. The EVCU may continuously check for anomalies or deviations in the operation of vehicle components, which could indicate potential issues or failures.

The communication channel will now be discussed in greater detail. FIGS. 1-2 highlight examples of the communication channel 120, which may also be shown in other figures. Vehicle communication channels 120 are designed to facilitate the transfer of data between the EVCU 110, sensors such as provided by high voltage loads 144, 146, the RESS 160, and other components of a connected EV. Communication channels may be operated via one or more protocols and/or network structures.

In one example, the communication channel 120 may operate over a controller area network (CAN). As will be appreciated by those of skill in the art, CAN is a robust, low-speed network designed to allow microcontrollers and devices to communicate with each other without a host computer. CAN allows for real-time communication and is known for its high resistance to interference, which is advantageous in the electrically noisy environment of a vehicle.

In another example, the communication signal may operate over a local interconnect network (LIN). As will be appreciated by those of skill in the art, LIN is a simpler, cost-effective network protocol compared to CAN. LIN features is a single-wire network used for low-speed applications in vehicles, such as controlling windows, mirrors, seats, and simple sensors. In some communication signals 120, LIN and/or Automotive Ethernet may be used in conjunction with CAN, with LIN serving as a sub-network for non-critical functions, advantageously reducing the complexity and cost of the overall network system in a vehicle.

In one example, the communication channel 120 may operate at least partially over Automotive Ethernet. As will be appreciated by those of skill in the art, Automotive Ethernet includes a physical layer adapted to automotive use cases to connect components within a vehicle using an Ethernet network. Automotive Ethernet advantageously permits communication of data using high speed, switched networks over internet protocol (IP) similar to standard Ethernet, to provide improved bandwidth and flexibility over traditional automotive communication protocols like CAN and LIN. Automotive Ethernet may additionally improve scalability by supporting high data rates, simplified twisted-pair designs, low latency transmission, and advanced protocols and services such as Power over Ethernet (POE) and Quality of Service (QOS), without limitation.

In an additional example, the communication signal may operate wireless technologies such as Bluetooth, Wi-Fi, vehicle-to-everything (V2X), cellular, and/or other wireless connections that will be appreciated by those of skill in the art after having the benefit of this disclosure. In some embodiments, advanced communication technologies like Automotive Ethernet, which offers higher bandwidth and supports the increasing data demands of modern vehicles, may additionally be used to transmit the communication signal.

The high voltage rails 130 will now be discussed in greater detail. FIGS. 1-2 highlight examples of the high voltage rail, which may also be shown in other figures. Voltage rails in the context of electric vehicles refer to the electrical pathways through which electrical power is delivered to various components within the vehicle. Multiple voltage rails may be included by an electrical system, for example, high voltage rails and low voltage rails, which may assist with each component receiving the appropriate voltage for its operation.

A voltage rail in an electric vehicle may include an electrical power supply line that carries a particular voltage level. Different components in the EV require different voltage levels to operate efficiently, and voltage rails ensure that these components receive the correct voltage. A voltage rail may connect between various components via positive and negative terminals. For example, a high voltage rail may connect to a high voltage load via a high voltage load positive terminal and high voltage load negative terminal. A voltage differential provided by the high voltage rail to the high voltage load may be determined by measuring a difference in potential between the high voltage load positive terminal and the high voltage load negative terminal, which may be beneficial when determining whether the voltage provided via the high voltage rail is compliant and/or within an acceptable proximity to a voltage set point. Illustrative voltage set points may include a low voltage set point, evaluation voltage set point, high voltage set point, and/or other voltage set points that will be apparent to a person of skill in the art after having the benefit of this disclosure.

The high voltage rail 130 may carry a high voltage being within voltage class B as defined by ISO 21498-1 and may be primarily used to power the electric motor, inverter, and/or additional components. The high voltage rail may be sourced from the RESS 160, which may be accessed via the HVDB 140. Alongside the high voltage rail, a low voltage rail 154 may additionally be provided to carry voltages similar to traditional vehicles, typically around 12 volts to 24 volts. The low voltage rail 154 may be used to power the vehicle's electronic systems, lighting, infotainment, and control systems. This rail is often powered by a DC-to-DC voltage converter 150, which may buck or step down the high voltage from the main battery. As is discussed throughout this disclosure, power may be supplied to the DC-to-DC voltage converter 150 from the low voltage source 152 via the low voltage rail 154, which may be boosted to a high voltage and distributed to the HVDB 140 via the DC voltage converter voltage rail 132.

High voltage loads will now be discussed in greater detail. FIG. 1 highlights examples of high voltage loads, which may also be shown in other figures. High voltage loads 144, 146 in electric vehicles may be provided by components or systems within the vehicle that operate using the higher voltage supplied by the RESS 160, such as via the HVDB 140. As will be appreciated by those of skill in the art, in electric vehicles, high voltage typically refers to the electrical system or components that operate at voltages significantly higher than the standard 12-volt system. High voltage is usually in the range of 400 volts or higher, which may reach or exceed 800 volts in some applications.

Illustrative active high voltage loads 146 in electric vehicles may include the electric traction motor, which converts electrical energy from the RESS 160 into mechanical energy to drive the wheels of the vehicle. Another illustrative active high voltage load includes the power electronics, such as the inverter to convert the DC power from the battery to AC power for the electric motor or DC voltage converter to buck or step-down high voltage to lower voltages suitable for other vehicle systems. In some applications, parts of an HVAC system in EVs may operate on high voltage to efficiently manage the cabin climate.

Illustrative passive high voltage loads 144 may include electric heaters, such as may be used for cabin heating; electrochemical capacitors, which may be used for energy storage and power smoothing; resistances inherent to high voltage cables and connectors; battery and RESS cooling systems; and other passive loads that will be appreciated by skilled artisans after having the benefit of this disclosure.

The high voltage distribution box (HVDB) will now be discussed in greater detail. FIG. 1 highlights examples of the high voltage distribution box (HVDB), which may also be shown in other figures. A high voltage distribution box (HVDB), which may also be known as a high voltage distribution unit (HVDU), assists with managing and distributing high voltage power within an electric vehicle. The HVDB 140 can be designed to handle voltages typically in the range of 400 to 800 volts, with some embodiments being capable of handling electrical power with higher voltages.

The HVDB 140 is often closely integrated with the RESS 160 and/or battery management system (BMS), which can monitor the health and state of the RESS 160 and communicates with the HVDB 140 to ensure optimal distribution of power based on the battery's condition and the vehicle's power requirements.

The HVDB 140 may include diagnostic and monitoring capabilities, which may allow for real-time monitoring of HVDB 140 performance and can aid in early detection of issues, contributing to the overall maintenance and reliability of the EV's electrical system. For a HVDB 140 having diagnostic and monitoring capabilities, the HVDB 140 may communicate with the EVCU 110 via the communication channel 120.

The DC voltage converter will now be discussed in greater detail. FIGS. 1-2 highlight examples of the DC voltage converter 150, which may also be shown in other figures. A DC voltage converter is an electronic circuit or electromechanical device that converts a source of direct current (DC) from one voltage level to another. For example, a DC voltage converter 150 might be used to convert the 12-volt or 24-volt DC power from an automotive battery provided by a low voltage power source 152 to a 60-volt DC evaluation voltage power level to test the high voltage rails 130.

DC voltage converter 150 may include one or more buck-boost converters that combine the functionalities of buck and boost converters to step up or step down the input voltage as needed. For example, a DC voltage converter 150 provided as a buck-boost converter may advantageously operate in one of two configurations. As a first configuration, the DC voltage converter 150 may operate as a buck converter (step down converter) to transfer energy from the RESS or other high voltage battery to the low voltage battery. In this buck configuration, the DC/DC converter may act like a traditional alternator in an internal combustion vehicle. As a second configuration, the DC voltage converter 150 may operate as a boost converter (step up converter) to take energy from the automotive battery or other low voltage battery and create an evaluation voltage, for example less than 60 voltage within voltage class A as defined by ISO 21498-1, and subsequently a high voltage within voltage class B as defined by ISO 21498-1 to precharge the system and enable the RESS to close its contactors. Use of a buck-boost DC-to-DC voltage converter provides versatility that is advantageous to operating a system and method enabled by this disclosure, as it is capable of handling a wide range of input voltages and providing a stable output voltage even if the input varies or desired output level changes. In some embodiments, provided without limitation, alternative DC voltage regulators may be used in combination with the above-described buck-boost converters, for example, linear regulators, buck converters, or boost converters.

In a typical buck-boost converter, the switch alternately connects an inductor to the input to store energy, and then disconnects it to transfer the energy to the output. The mode of operation (buck or boost) depends on the relative magnitude of the input voltage to the desired output voltage. Using a buck-boost DC-to-DC voltage converter as the DC voltage converter 150 in a system enabled by this disclosure advantageously permits an input voltage to be converted and outputted above or below the input voltage.

The rechargeable electrical storage system (RESS) will now be discussed in greater detail. FIG. 1 highlights examples of the rechargeable electrical storage system (RESS), which may also be shown in other figures. A RESS 160 may store electrical energy and release it when needed. An RESS 160 is advantageously able to be recharged after the stored energy has been depleted. As will be appreciated by those of skill in the art, a RESS 160 includes a battery, which is typically made up of one or more electrochemical cells, which may be constructed using lithium-ion, lead-acid, nickel-cadmium, lithium iron phosphate, nickel-metal hydride, and/or other constructions of electrochemical batteries that will be apparent to a person of skill in the art after having the benefit of this disclosure. Operation of an RESS 160 may be managed by a battery management system (BMS) to ensure safe and efficient charging and discharging.

In operation, a method may be provided for eliminating the need for a high voltage interlock loop wire when verifying operational status of high voltage rails between a rechargeable energy storage system, high voltage distribution box, and high voltage load. Those of skill in the art will appreciate that the following methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

With reference along to FIGS. 1-3, an illustrative operation for validating a high voltage connection in an electric vehicle, which involves an EVCU 110 will now be discussed, without limitation. The operation described in this example may advantageously increase the safe and efficient operation of an electric vehicle's high voltage electrical systems by validating a high voltage connection in an electric vehicle equipped with an electric vehicle control unit (EVCU) 110. The EVCU 110 is configured to receive communication signals communicated over a communication channel 120, which can include voltage report data indicating the operational status of the high voltage connection 130. The illustrative system also includes a rechargeable electrical storage system (RESS) 160, electrically connected to a high voltage distribution box (HVDB) 140 designed to selectively provide high voltage electrical power to one or more high voltage load 144, 146.

Before the high voltage rails 130 are energized with high voltage electrical power, the system may be validated. The validation process may involve several steps, the states of which are illustrated in graph 200 of FIG. 2, wherein voltage is plotted on the Y-axis and time is plotted on the X-axis.

Initially, the operation may begin in a RESS open state, as illustrated as point 210. The low voltage electrical power from a low voltage power source 152 may be boosted by the DC voltage converter 150 to an evaluation voltage level, such as within a class A voltage as defined by ISO 21498-1, as indicated by point 220 of graph 200. The DC voltage converter 150 is electrically connected between the HVDB 140 and the low voltage power source 152. The boosted evaluation voltage electrical power is then supplied to the high voltage load 144, 146 over a load high voltage rail 134, 136 via the HVDB 140.

The high voltage load 144, 146 then detects the load voltage reading of the evaluation voltage electrical power received over the load high voltage rail 134, 136. This reading is reported back to the EVCU 110 via the communication channel 120 as part of the voltage report data. The EVCU 110 analyzes the voltage report data to determine if it complies with an acceptable proximity to an evaluation voltage set point.

If the voltage report data does not comply with the evaluation voltage set point, the EVCU 120 determines that an operational status indicates a high voltage interlock loop (HVIL) breach has occurred. Conversely, if the voltage report data complies with the evaluation voltage set point, the operational status is considered nominal. In this case, the EVCU 110 controls the DC voltage converter 150 to boost the low voltage electrical power being within voltage class A as defined by ISO 21498-1 to high voltage electrical power being within voltage class B as defined by ISO 21498-1, as indicated by point 230 of graph 200. This high voltage power is then provided from the DC voltage converter 150 to the high voltage load 144, 146 via the HVDB 140 at a high voltage set point.

Once the EVCU 110 determines that the high voltage set point is reached and stable, it sets the RESS high voltage connection between the RESS 160 and the HVDB 140 from a RESS open state to a RESS closed state. This allows transmission of high voltage electrical power from the RESS 160 to the high voltage load 144, 1456 via the HVDB 140.

The EVCU 110 continues to monitor the voltage report data to ensure it remains within an acceptable proximity to the high voltage set point. If it detects non-compliance, the operational status is adjusted to indicate that an HVIL breach has occurred.

The method may include the capability to switch the RESS high voltage connection between an open state and a closed state, which may be controlled via the EVCU 110. This ability to be switched between states advantageously promotes effective management and validation of the high voltage connection in the electric vehicle.

Referring now to flowchart 300 of FIG. 3, an example method for an illustrative operation to validate an electrical connection will be described, without limitation. Starting with Block 310, the operation may begin by the DC voltage converter boosting the low voltage electrical power to an evaluation voltage electrical power. (Block 312). The evaluation voltage electrical power may be provided to one or more high voltage loads via the HVDB. (Block 314). The HVDB may deliver the evaluation voltage electrical power to the high voltage load via the high voltage rail, for example. The high voltage load may then determine the voltage present on the high voltage rail, which it may report to the EVCU, for example, via the communication signal. (Block 316). It may then be determined if the voltage present on the high voltage rail is compliant with the evaluation voltage set point. (Block 320).

If it is determined at Block 320 that the evaluation voltage detected from the high voltage rail is not compliant with the evaluation voltage set point, the operational status may indicate that an HVIL breach has occurred. (Block 340). If it is determined at Block 320 that the evaluation voltage detected from the high voltage rail is compliant with the evaluation voltage set point, the DC voltage converter may then boost the low voltage electric power to high voltage electric power, which may be delivered to additional components via the high voltage rail. (Block 322). The high voltage load may then determine voltage on the high voltage rail and again report to the EVCU. (Block 324). It may then be determined if the high voltage electrical power detected at the high voltage rail is reached and stable with regard to the high voltage set point. (Block 330).

If it is determined at Block 330 that the high voltage set point has not been reached and/or is not stable within the required time period, it may be determined that an HVIL breach has occurred (Block 342), after which the operation will terminate at Block 350.

If it is determined at Block 330 that the high voltage set point has been reached and is stable within the required time period, the operation may continue to switch the RESS high voltage connection to the RESS closed state. (Block 332). The RESS may then supply high voltage electrical power to the high voltage load via the HVDB. (Block 334). After the RESS is configured in the closed state, the EVCU may continue to monitor the high voltage presence for a HVIL breach. The operation may then end at Block 350.

While various aspects have been described in the above disclosure, this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A high voltage interlock loop elimination system for validating a high voltage connection in an electric vehicle comprising:
   an electric vehicle control unit (EVCU) configured to receive a communication signal comprising voltage report data indicative of an operational status of the high voltage connection;
   a high voltage distribution box (HVDB) electrically connected to a high voltage load via a load high voltage rail, the high voltage load being capable of reporting a load voltage reading for the load high voltage rail to be included by the voltage report data;
   a rechargeable electrical storage system (RESS) electrically connected to the HVDB via a RESS high voltage connection to selectively provide a high voltage electrical power to the high voltage load via the HVDB, the RESS high voltage connection to the HVDB being switchable between a RESS open state and a RESS closed state;
   a DC voltage converter electrically connected between the HVDB and a low voltage power source;
   wherein prior to setting the RESS high voltage connection to the RESS closed state, the following steps are performed:
   a) the DC voltage converter boosts low voltage electrical power from the low voltage power source to evaluation voltage electrical power to be provided to the high voltage load over the load high voltage rail via the HVDB;
   b) the high voltage load detects the load voltage reading of the evaluation voltage electrical power received over the load high voltage rail to report to the EVCU via a communication channel in the voltage report data;
   c) the EVCU analyzes the voltage report data to determine compliance with an acceptable proximity to an evaluation voltage set point, wherein;
      i) if the voltage report data is not compliant with the evaluation voltage set point, determining the operational status to indicate that a High Voltage Interlock Loop (HVIL) breach has occurred, and
      ii) if the voltage report data is compliant with the evaluation voltage set point, determining the operational status is nominal and controlling the DC voltage converter to boost the low voltage electrical power to the high voltage electrical power to be provided to the high voltage load via the HVDB at a high voltage set point;
   d) upon determining by the EVCU that the high voltage set point is reached and stable, setting the RESS high voltage connection to the RESS closed state to transmit the high voltage electrical power from the RESS to the high voltage load via the HVDB; and
   e) monitoring the voltage report data by the EVCU to ensure compliance with the acceptable proximity to the high voltage set point and, if detecting the compliance is false, determining the operational status to indicate the HVIL breach has occurred.

2. The system of claim 1, wherein the high voltage electrical power is equivalent to voltage class B as defined by ISO 21498-1.

3. The system of claim 1, wherein the RESS detects a RESS voltage differential received over the RESS high voltage connection to report to the EVCU via the communication channel in the voltage report data.

4. The system of claim 1, wherein the load voltage reading of the load high voltage rail is measured between a high voltage load positive terminal and a high voltage load negative terminal.

5. The system of claim 1, wherein the communication network operates via one or more of a controller area network (CAN), local interconnect network (LIN), and Automotive Ethernet.

6. The system of claim 1, wherein the DC voltage converter is a buck-boost DC-to-DC power converter.

7. The system of claim 1, wherein the low voltage power is between 12 volts to 24 volts.

8. The system of claim 1, wherein the evaluation voltage power is between 40 volts and 60 volts.

9. The system of claim 1, wherein the low voltage power source comprises an automotive battery.

10. A system for eliminating high voltage interlock loop for validating a high voltage connection in an electric vehicle comprising:
   an electric vehicle control unit (EVCU) configured to receive a communication signal comprising voltage report data indicative of an operational status of the high voltage connection;
   a high voltage distribution box (HVDB) electrically connected to a high voltage load via a load high voltage rail, the high voltage load reporting a load voltage reading for the load high voltage rail to be included by the voltage report data;
   a rechargeable electrical storage system (RESS) electrically connected to the HVDB via a RESS high voltage connection to selectively provide high voltage electrical power to the high voltage load via the HVDB, the RESS high voltage connection to the HVDB switchable between a RESS open state and a RESS closed state via the EVCU;
   a DC voltage converter electrically connected between the HVDB and a low voltage power source;
   wherein prior to setting the RESS high voltage connection to the RESS closed state, the following steps are performed:
   a) the DC voltage converter boosts low voltage electrical power from the low voltage power source to evaluation voltage electrical power to be provided to the high voltage load over the load high voltage rail via the HVDB;
   b) the high voltage load detects the load voltage reading of the evaluation voltage electrical power received over the load high voltage rail to report to the EVCU in the voltage report data;
   c) the RESS detects a RESS voltage differential received over the RESS high voltage connection to report to the EVCU via a communication channel in the voltage report data
   d) the EVCU analyzes the voltage report data to determine compliance with an acceptable proximity to the evaluation voltage set point, wherein
      i) if the voltage report data is not compliant with the evaluation voltage set point, determining the operational status to indicate that a High Voltage Interlock Loop (HVIL) breach has occurred, and
      ii) if the voltage report data is compliant with the evaluation voltage set point, determining the operational status is nominal and controlling the DC voltage converter to boost the low voltage electrical power to the high voltage electrical power to be provided to the high voltage load via the HVDB at a high voltage set point;
   e) upon determining by the EVCU that the high voltage set point is reached and stable, setting the RESS high voltage connection to the RESS closed state to transmit the high voltage electrical power from the RESS to the high voltage load via the HVDB;
   wherein the DC voltage converter is a buck-boost DC-to-DC power converter.

11. The system of claim 10, wherein after the RESS high voltage connection is set to the RESS closed state, the EVCU monitors the voltage report data to ensure compliance with the acceptable proximity to the high voltage set point and, if detecting the compliance is false, determining the operational status to indicate the HVIL breach has occurred.

12. A method for validating a high voltage connection in an electric vehicle comprising an electric vehicle control unit (EVCU) configured to receive a communication signal comprising voltage report data indicative of an operational status of the high voltage connection, and a rechargeable electrical storage system (RESS) electrically connected to a high voltage distribution box (HVDB) to selectively provide high voltage electrical power to a high voltage load via the HVDB, the method comprising:
   a) boosting, via a DC voltage converter electrically connected between the HVDB and a low voltage power source, low voltage electrical power from the low voltage power source to evaluation voltage electrical power to be provided to the high voltage load over a load high voltage rail via the HVDB;
   b) detecting, via the high voltage load, a load voltage reading of the evaluation voltage electrical power received over the load high voltage rail to report to the EVCU via a communication channel in the voltage report data;
   c) analyzing, via the EVCU, the voltage report data to determine compliance with an acceptable proximity to an evaluation voltage set point, wherein:
      i) if the voltage report data is not compliant with the evaluation voltage set point, determining the operational status to indicate that a High Voltage Interlock Loop (HVIL) breach has occurred, and
      ii) if the voltage report data is compliant with the evaluation voltage set point, determining the operational status is nominal and controlling the DC voltage converter to boost the low voltage electrical power to the high voltage electrical power to be provided to the high voltage load via the HVDB at a high voltage set point;
   d) upon determining by the EVCU that the high voltage set point is reached and stable, setting a RESS high voltage connection between the RESS and the HVDB to a RESS closed state to transmit the high voltage electrical power from the RESS to the high voltage load via the HVDB; and
   e) monitoring the voltage report data by the EVCU to ensure compliance with the acceptable proximity to the high voltage set point and, if detecting the compliance is false, determining the operational status to indicate the HVIL breach has occurred;

wherein the RESS high voltage connection is switchable between a RESS open state and the RESS closed state via the EVCU.

13. The method of claim 12, wherein the high voltage electrical power is equivalent to voltage class B as defined by ISO 21498-1.

14. The method of claim 12, wherein step b) further comprises:
   detecting, via the RESS, a RESS voltage differential received over the RESS high voltage connection to report to the EVCU via the communication channel in the voltage report data.

15. The method of claim 12, wherein the load voltage reading of the load high voltage rail is measured between a high voltage load positive terminal and a high voltage load negative terminal.

16. The method of claim 12, wherein the communication network operates via one or more of a controller area network (CAN) and Automotive Ethernet.

17. The method of claim 12, wherein the DC voltage converter is a buck-boost DC-to-DC power converter.

18. The method of claim 12, wherein the low voltage power is between 12 volts to 24 volts.

19. The method of claim 12, wherein the evaluation voltage power is between 40 volts and 60 volts.

20. The method of claim 12, wherein the low voltage power source comprises an automotive battery.

* * * * *